(12) United States Patent
Nakamae et al.

(10) Patent No.: US 8,294,123 B2
(45) Date of Patent: Oct. 23, 2012

(54) LASER PROCESSING METHOD AND LASER PROCESSING APPARATUS

(75) Inventors: Kazuo Nakamae, Yokohama (JP); Motoki Kakui, Yokohama (JP); Shinobu Tamaoki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 344 days.

(21) Appl. No.: 11/878,973

(22) Filed: Jul. 30, 2007

(65) Prior Publication Data

US 2008/0210886 A1  Sep. 4, 2008

(30) Foreign Application Priority Data

Aug. 30, 2006  (JP) ................ P2006-234308

(51) Int. Cl.
    *G21K 5/10*  (2006.01)
(52) U.S. Cl. ............... 250/491.1; 250/492.1; 250/492.2; 250/493.1; 250/494.1; 250/495.1; 219/121.6; 219/121.78; 219/121.82; 356/623; 356/3.1; 356/3.14
(58) Field of Classification Search ............... 250/492.1, 250/491.1, 492.2, 493.1, 494.1, 495.1; 348/345; 219/121.6, 121.78, 121.82; 356/623, 3.1, 356/3.14
    See application file for complete search history.

(56) References Cited

U.S. PATENT DOCUMENTS

| | | | | |
|---|---|---|---|---|
| 4,272,193 A | * | 6/1981 | Eastman et al. | 356/486 |
| 4,815,819 A | * | 3/1989 | Mayhew et al. | 359/478 |
| 4,888,490 A | * | 12/1989 | Bass et al. | 250/559.16 |
| 5,209,813 A | * | 5/1993 | Oshida et al. | 216/59 |
| 5,311,288 A | * | 5/1994 | Shahar | 356/623 |
| 5,545,160 A | * | 8/1996 | O'Rourke | 606/10 |
| 5,615,038 A | * | 3/1997 | Suzuki et al. | 359/210.1 |
| 5,629,756 A | * | 5/1997 | Kitajima | 356/3.09 |
| 5,643,801 A | * | 7/1997 | Ishihara et al. | 250/492.1 |
| 5,760,366 A | * | 6/1998 | Haruta et al. | 219/121.68 |
| 5,807,387 A | * | 9/1998 | Druais | 606/10 |

(Continued)

FOREIGN PATENT DOCUMENTS

JP  63-108981 A  5/1988

(Continued)

OTHER PUBLICATIONS

SUNX LP-V Series catalog No. CJ-LPV10-I-10, Nov. 2005, p. 10, with Partial English translation.

(Continued)

*Primary Examiner* — Michael Logie
(74) *Attorney, Agent, or Firm* — McDermott Will & Emery LLP

(57) ABSTRACT

The present invention relates to a laser processing method and the like having a structure for making it possible to process an object to be processed in various ways while accurately adjusting the installation state of the object. The method irradiates the object with plural adjustment laser light beams that are set in a specific positional relationship against a converging point of processing laser light beam, and adjusts the state of installation of the object while monitoring irradiation areas of the adjustment laser light beams on the surface of the object. Each irradiation directions of adjustment laser light beams is different from that of the processing laser light beam. By reflecting the irradiation condition of the adjustment laser light beam and monitored information of the irradiation areas in positional adjustment of the object, the installation state of the object can be adjusted in accordance with various kinds of processing.

12 Claims, 4 Drawing Sheets

U.S. PATENT DOCUMENTS

| | | | | |
|---|---|---|---|---|
| 6,110,291 | A * | 8/2000 | Haruta et al. | 118/726 |
| 6,320,641 | B1 * | 11/2001 | Bauer et al. | 355/18 |
| 6,501,781 | B1 * | 12/2002 | Maurer et al. | 372/75 |
| 6,605,083 | B2 * | 8/2003 | Clement et al. | 606/17 |
| 6,693,702 | B2 * | 2/2004 | Rogers | 356/3.1 |
| 6,862,098 | B1 * | 3/2005 | Tanuma et al. | 356/623 |
| 6,992,026 | B2 * | 1/2006 | Fukuyo et al. | 438/797 |
| 7,104,689 | B2 * | 9/2006 | Ihalainen | 378/206 |
| 7,396,742 | B2 * | 7/2008 | Fukuyo et al. | 438/463 |
| 7,732,730 | B2 * | 6/2010 | Fukuyo et al. | 219/121.65 |
| 7,859,659 | B2 * | 12/2010 | Xu et al. | 356/300 |
| 2002/0126333 | A1 * | 9/2002 | Hosono et al. | 359/35 |
| 2003/0103203 | A1 * | 6/2003 | Isozaki et al. | 356/237.2 |
| 2004/0002199 | A1 * | 1/2004 | Fukuyo et al. | 438/460 |
| 2004/0141590 | A1 * | 7/2004 | Ihalainen | 378/206 |
| 2005/0212951 | A1 * | 9/2005 | Miyata et al. | 348/345 |
| 2005/0224475 | A1 * | 10/2005 | Nomaru | 219/121.82 |
| 2005/0242286 | A1 * | 11/2005 | Watanabe et al. | 250/310 |
| 2006/0046156 | A1 * | 3/2006 | Amako et al. | 430/1 |
| 2006/0060781 | A1 * | 3/2006 | Watanabe et al. | 250/310 |
| 2006/0133085 | A1 * | 6/2006 | Bendner et al. | 362/259 |
| 2006/0144828 | A1 * | 7/2006 | Fukumitsu et al. | 219/121.67 |
| 2006/0151443 | A1 * | 7/2006 | Fukuyo et al. | 219/121.6 |
| 2007/0158314 | A1 * | 7/2007 | Fukumitsu et al. | 219/121.6 |
| 2008/0037003 | A1 * | 2/2008 | Atsumi et al. | 356/72 |
| 2009/0166342 | A1 * | 7/2009 | Kuno et al. | 219/121.67 |
| 2010/0012632 | A1 * | 1/2010 | Sakamoto | 219/121.72 |

FOREIGN PATENT DOCUMENTS

| | | |
|---|---|---|
| JP | 06-328283 A | 11/1994 |
| JP | 10-133145 | 5/1998 |

OTHER PUBLICATIONS

Japanese Office Action, with English translation thereof, issued in Japanese Patent Application No. 2006-234308, issued Jul. 28, 2011.
Japanese Office Action, with English translation, issued in Japanese Patent Application No. 2006-234308, dated Mar. 21, 2012.

* cited by examiner

LASER PROCESSING METHOD AND LASER PROCESSING APPARATUS

BACKGROUND OF THE INVENTION

1. Field of the Invention

The present invention relates to a laser processing method and a laser processing apparatus which irradiate an object to be processed with processing laser light beam, thereby being employable in processing techniques such as those for printing, cutting, and welding the object.

2. Related Background Art

As a technique for irradiating an object to be processed with converged laser light and thereby processing the object, one disclosed in Japanese Patent Application Laid-Open No. HEI 10-133145 (Document 1) has been known. The technique disclosed in Document 1 emits laser light to the object separately from processing infrared laser light. Namely, when the diameter of the irradiation area of laser light on the object is measured, the position of the object is adjusted such that thus measured irradiation area diameter coincides with a reference diameter. Then, the object having adjusted its position is irradiated with the processing infrared laser light, so as to be processed.

SUMMARY OF THE INVENTION

The present inventors have examined the conventional laser processing techniques, and as a result, have discovered the following problems.

Namely, the accuracy of positional adjustment is not so high in the technique disclosed in the above-mentioned Document 1, since the position of the object is adjusted in accordance with the measured irradiation area diameter of the laser light for positional adjustment of the object. Furthermore, in the conventional laser processing technique, since the grasping the depth position of a converging point of the processing laser light beam is hard, it is difficult to change irradiation conditions during a laser processing.

The present invention has been developed to eliminate the problems described above. It is an object of the present invention to provide a laser processing method and apparatus for making it possible to process an object to be processed while accurately adjusting the position thereof.

A laser processing method according to the present invention processes an object to be processed by irradiating the surface of the object with processing laser light beam. Therefore, the laser processing method irradiates the surface of the object with a plurality of adjustment laser light beams (first step), monitors the surface of the object on which the adjustment laser light beams are applied (second step), extracts information concerning the irradiation area of the adjustment laser light beams (third step), and adjusts the state of installation of the object to be processed (fourth step).

Specifically, in the first step, the surface of the object is irradiated with the plurality of adjustment laser light beams, from respective irradiation directions different from each other through optical paths different from an optical path of the processing laser light beam, while satisfying a specific positional relationship with respect to a converging point of the processing laser light beam. The position of the converging point of the processing laser light beam and the position of the intersection of adjustment laser light beams are not required to coincide with each other. They may be set in intentionally deviated states. It will be sufficient when only a relative positional relationship between the converging point of the processing laser light beam and the intersection of the adjustment laser light beams is known. In the second step, irradiation areas of the plurality of adjustment laser light on the surface of the object are monitored. In the third step, positional information of the surface of the object with respect to the converging point of the processing laser light beam is exacted, on the basis of information of the irradiation areas and the specific positional relationship. In the fourth step, the object is moved so as to make the position of the object to the converging point of the processing laser light beam correspond to a preset position. The adjustment of the fourth step itself may be conducted manually.

In the laser processing method according to the present invention, it is preferable that the plurality of the adjustment laser light beams are applied so as to intersect with each other at the converging point of the processing laser light beam.

In the laser processing method according to the present invention, at least one of the plurality of the adjustment laser light beams may have a beam cross-section with a predetermined shape. In this case, after exacting information concerning the beam cross-section of the one adjustment laser light by monitoring the associated one of the irradiation areas, the inclinatory condition of the object can be adjusted on the basis of the exacted information.

Furthermore, the laser processing method according to the present invention uses at least two adjustment laser light beams respectively applied from the different irradiation directions so as to make it possible to intersect with each other. That is, the laser processing method according to the present invention can monitor the relationship between the movement condition of the object and the depth position of the converging point of the processing laser light beam. The movement condition of the object in a depth direction includes an amount of movement, moving time, and the like. Therefore, the laser processing method can change irradiation condition of the processing laser light beam, in accordance with the movement condition of the object in a depth direction. In other words, a laser irradiation condition for the processing laser light beam is changed in accordance with the depth position of the converging point of the processing laser light beam from the surface of the object. For example, the change of the laser irradiation condition includes a change between continuous light and pulsed light, a change between lower power and high power, and the like.

A laser processing apparatus according to the present invention processes an object to be processed by irradiating the object with processing laser light beam, and comprises a processing laser light source, a converging optical system, an adjustment laser light source, an adjustment optical system, an adjustment section, a measurement section, and a control section.

The processing laser light source outputs processing laser light beam for irradiating the object. The converging optical system converges the processing laser light beam outputted from the processing laser light source. The adjustment laser light source outputs a plurality of adjustment laser light beams for irradiating the object. The adjustment optical system guides the plurality of adjustment laser light beams from respective directions different from each other to the object, while satisfying a specific positional relationship with respect to a converging point of the processing laser light beam. The adjustment section moves the object. The measurement section monitors respective irradiation areas of the plurality of adjustment laser light beams on the object. The control section exacts a positional information of the surface of the object with respect to the converging point of the processing laser light beam, on the basis of information of the irradiation areas and the specific positional relationship, and calculates an amount of control for controlling said adjustment section so as to make the position of the object with respect to the converging point of the processing laser light beam correspond to a preset position.

In the laser processing apparatus according to the present invention, the adjustment section preferably guides the plurality of adjustment laser light beams so as to intersect with each other at the converging point of the processing laser light beam. The adjustment section may include a driver for moving a stage on which the object is set.

Furthermore, in the laser processing apparatus according to the present invention, at least one of the plurality of the adjustment laser light beams may have a beam cross-section with a predetermined shape. In this case, when exacting information concerning the beam cross-section of the one adjustment laser light by monitoring the associated one of the irradiation areas, the control section controls the adjustment section to adjust the inclinatory condition of the object on the basis of the exacted information. Specifically, the control section calculates a direction and amount of inclination of the object on the basis of respective deformation ratios of the measured irradiation area forms of the plurality of adjustment laser light beams with respect to cross-sectional beam forms thereof, and adjusts the state of installation of the object with respect to the converging point of the processing laser light beam on the basis of the calculated direction and amount of inclination of the object.

Furthermore, in the laser processing apparatus according to the present invention, a laser irradiation condition of the processing laser light beam may be changed in accordance with the depth position of the converging point of the processing laser light beam from the surface of the object.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1A:
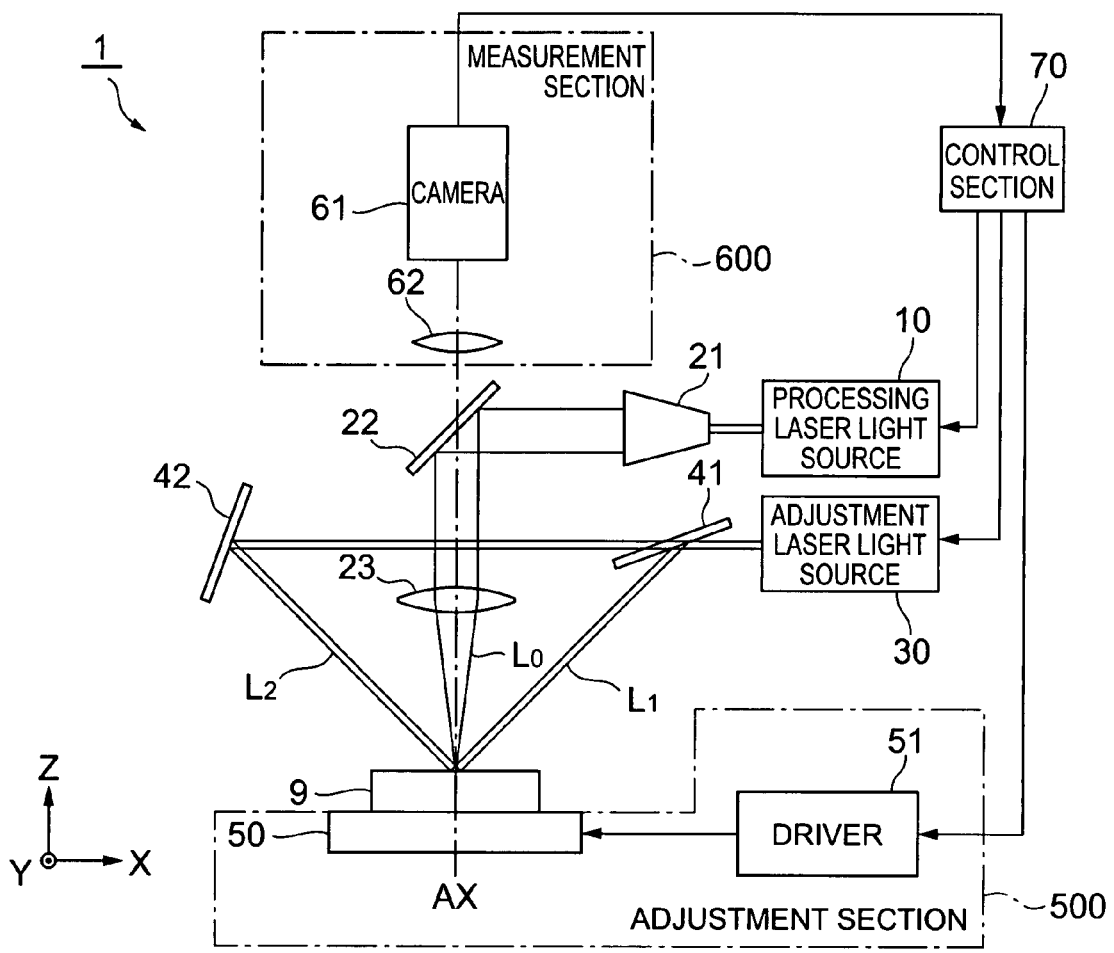
FIGS. 1A and 1B are views showing the structure of a first embodiment of a laser processing apparatus according to the present invention.

In the following, embodiments of a laser processing method and laser processing apparatus according to the present invention will be explained in detail in reference with FIGS. 1A, 1B, and 2-4. In the description of the drawings, identical or corresponding components are designated by the same reference numerals, and overlapping description is omitted.

First Embodiment

Figure 1B:
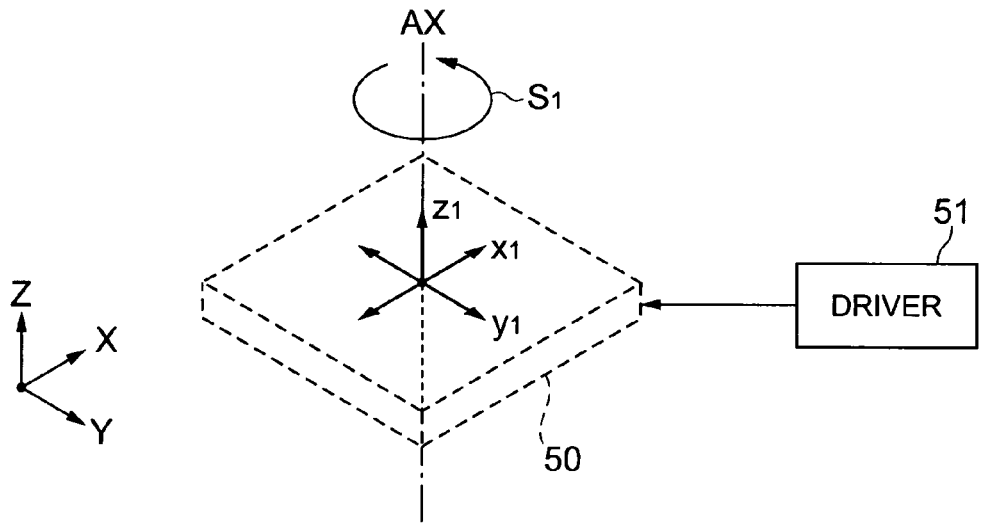

To begin with, a first embodiment of the laser processing apparatus and method according to the present invention will be explained. FIGS. 1A and 1B are views showing the structure of the first embodiment of the laser processing apparatus according to the present invention. The laser processing apparatus 1 according to the first embodiment shown in FIG. 1A, which irradiates an object to be processed 9 with converged processing laser light $L_0$ so as to process the object 9, comprises a processing laser light source 10, a beam expander 21, a mirror 22, a condenser lens 23, an adjustment laser light source 30, a mirror 41, a mirror 42, a stage 50, a driver 51, CCD camera 61, imaging lens 62, and control section 70. The CCD camera 61 and imaging lens 62 constitute a measurement section 600. The stage 50 and driver 51 constitute an adjustment section 500.

The processing laser light source 10, which is a light source for outputting the processing laser light $L_0$ for processing the object to be processed 9, is a YAG laser light source for outputting laser light having a wavelength of 1064 nm, for example. The beam expander 21, mirror 22, and condenser lens 23 constitute a processing optical system (converging optical system) for converging the processing laser light $L_0$.

The beam expander 21 expands the beam diameter of the processing laser light $L_0$ outputted from the processing laser light source 10. The mirror 22 reflects the processing laser light $L_0$ outputted from the beam expander 21, and perpendicularly irradiates the surface of the object to be processed 9 with the reflected processing laser light $L_0$. The condenser lens 23 is arranged between the mirror 22 and the object to be processed 9, and converges the processing laser light $L_0$ reflected by the mirror 22.

The adjustment laser light source 30 is a light source for outputting the adjustment visible laser light. Preferably, the adjustment visible laser light outputted from the adjustment laser light source 30 has a wavelength falling within a visible region such that operators can visually verify it.

The mirrors 41 and 42 constitute an adjustment optical system which irradiates the object to be processed 9 with two adjustment visible laser light beams $L_1$, $L_2$ outputted from the adjustment laser light source 30 from respective directions different from each other such that the visible laser light beams $L_1$, $L_2$ intersect with each other at one point on an optical path of the processing laser light $L_0$ (corresponding to the optical axis AX of the imaging lens 62). The mirror 41 divides the adjustment visible laser light outputted from the adjustment laser light source 30 into two, irradiates the object to be processed 9 with one adjustment visible laser light beam $L_1$, and emits the other adjustment visible laser light beam $L_2$ to the mirror 42. The mirror 42 reflects the adjustment visible laser light beam $L_2$ having arrived from the mirror 41, whereby thus reflected adjustment visible laser light beam $L_2$ irradiates the object to be processed 9.

In the laser processing apparatus according to the present invention, the object to be processed 9 is irradiated with the adjustment laser light beams $L_1$, $L_2$ from the respective irradiation directions different from each other through optical paths different from the optical path of the processing laser light $L_0$ as mentioned above. Therefore, no optical components are placed on the optical path of the processing laser light $L_0$, whereby this laser processing apparatus can fully secure a degree of freedom in setting the power of the processing laser light $L_0$. In a structure in which the processing laser light $L_0$ and adjustment laser light beams $L_1$, $L_2$ propagate through the same optical path, by contrast, a half mirror for combining the adjustment laser light beams $L_1$, $L_2$ is required to be arranged on the optical path of the processing laser light $L_0$. This lowers the power of the processing laser light $L_0$ irradiating the object to be processed 9, and thus is unfavorable.

The adjustment visible laser light beams $L_1$, $L_2$ applied to the object to be processed 9 may have any beam cross-sectional forms as long as they are measurable, such as circular, elliptical, square, oblong, and cross forms, for example.

The adjustment section 500 comprises the stage 50 on which the object to be processed 9 is mounted and the driver 51 for adjusting the state of installation of the object to be processed 9 by regulating the driving of the stage 50, and adjusts the direction and magnitude of inclination of the object to be processed 9. The position of the object to be processed 9 can be adjusted at least in a direction along the optical axis of the condenser lens 23. In particular, as shown in FIG. 1B, the driver 51 can move the stage 50 in the directions of x1, y1, and z1 axes with respect to an axis (coinciding with the optical axis AS of the imaging lens 62) orthogonal to the mounting surface of the stage 50, and rotate the stage 50 in the direction of arrow s1 about the optical axis AX of the imaging lens 62.

Here, when the inclination of the surface of the object to be processed 9 does not influence the processing of the object to be processed 9, or when the processing is not performed in the inclination state, only positional adjustment for the surface of the object to be processed 9 is enough. In contrast, when there is a negative effect due to the inclination on the surface of the object to be processed 9, or when the processing is performed in the condition of the inclination state, the inclination adjustment is performed together with the positional adjustment of the object to be processed 9.

The CCD camera 61 and imaging lens 62 constitute the measurement section 600 for measuring the irradiation positions of the two adjustment visible laser light beams $L_1$, $L_2$ emitted by the adjustment optical system in the object to be processed 9. The imaging lens 62 focuses reflected components of the adjustment visible laser light beams $L_1$, $L_2$ irradiating the surface of the object to be processed 9 onto the image pickup surface of the CCD camera 61. The measurement section 600 measures the respective forms of irradiation areas of the two adjustment visible laser light beams $L_1$, $L_2$ emitted by the adjustment optical system in the object to be processed 9. Namely, the CCD camera 61 captures images of the irradiation areas of the adjustment visible laser light beams $L_1$, $L_2$ in the surface of the object to be processed 9.

In accordance with the result of measurement by the CCD camera 61, the control section 70 controls the positional adjustment and inclination adjustment effected by the adjustment section 500. Namely, the control section 70 controls the positional adjustment of the object to be processed 9 effected by the adjustment section 500 such that the irradiation positions of the two adjustment visible laser light beams $L_1$, $L_2$ measured by the CCD camera 61 coincide with target positions preset in accordance with the specific positional relationship between the respective irradiation directions of the two adjustment visible laser light beams $L_1$, $L_2$ and the converging position of the processing laser light $L_0$. Also, the control section 70 controls the inclination adjustment of the object to be processed 9 effected by the adjustment section 500 such that the forms of irradiation areas of the adjustment visible laser light beams $L_1$, $L_2$ measured by the CCD camera 61 coincide with target forms preset according to the irradiation directions of the two adjustment visible laser light beams $L_1$, $L_2$, respectively. Further, the control section 70 controls the respective laser light outputs of the processing laser light source 10 and adjustment laser light source 30.

An example of operation of the laser processing apparatus 1 according to the first embodiment (the laser processing method according to the first embodiment) will now be explained. The operation explained in the following is performed under the control of the control section 70.

Before outputting the processing laser light $L_0$ from the processing laser light source 10, the adjustment laser light source 30 irradiates the object to be processed 9 with the adjustment visible laser light beams $L_1$, $L_2$ (first to third steps). Specifically, the laser light outputted from the adjustment laser light source 30 is divided into two by the adjustment optical system including the mirrors 41, 42, so as to yield the adjustment visible laser light beams $L_1$, $L_2$. Then, the adjustment optical system emits the adjustment visible laser light beams $L_1$, $L_2$ to the object to be processed 9 from the respective directions different from each other such that the laser light beams $L_1$, $L_2$ intersect with each other at one point on the optical path of the processing laser light $L_0$ (second step). The irradiation positions of the two adjustment visible laser light beams $L_1$, $L_2$ emitted by the adjustment optical system in the object to be processed 9 are measured according to the result of capture by the CCD camera 61 through the imaging lens 62 (third step).

The positional adjustment by the adjustment section 500 is controlled such that thus measured irradiation positions of the two adjustment visible laser light beams $L_1$, $L_2$ coincide with target positions preset according to the relationship between the respective irradiation directions of the two adjustment visible laser light beams $L_1$, $L_2$ and the converging position of the processing laser light $L_0$ (fourth step). Here, the target positions are preset as amounts of deviation in the first step prior to the second step. When the optical systems are adjusted in the first step such that the position of intersection of the two adjustment visible laser light beams $L_1$, $L_2$ coincides with the converging position of the processing laser light $L_0$, for example, the positional adjustment of the object to be processed 9 by the adjustment section 500 is controlled such that the measured irradiation positions of the two adjustment visible laser light beams $L_1$, $L_2$ coincide with each other.

After the positional adjustment mentioned above, the processing laser light source 10 irradiates the object to be processed 9 with processing laser light. The processing laser light $L_0$ outputted from the processing laser light source 10 is converged by the processing optical system (converging optical system) including the beam expander 21, mirror 22, and condenser lens 23, and then irradiates the object to be processed 9. Such a structure makes it possible to process the object to be processed 9 in various ways while accurately adjusting the state of installation of the object to be processed 9. The positional adjustment mentioned above can repeatedly be carried out during the laser processing.

The direction and magnitude of inclination of the object to be processed 9 is adjusted as follows. Namely, the forms of irradiation areas of the two adjustment visible laser light beams $L_1$, $L_2$ emitted by the adjustment optical system in the object to be processed 9 are measured according to the result of capture by the CCD camera 61 through the imaging lens 62. The inclination adjustment of the object to be processed 9 by the adjustment section 500 is controlled such that thus measured forms of irradiation areas of the two adjustment visible laser light beams $L_1$, $L_2$ coincide with target forms preset according to the respective irradiation directions of the two adjustment visible laser light beams $L_1$, $L_2$.

Figure 2:
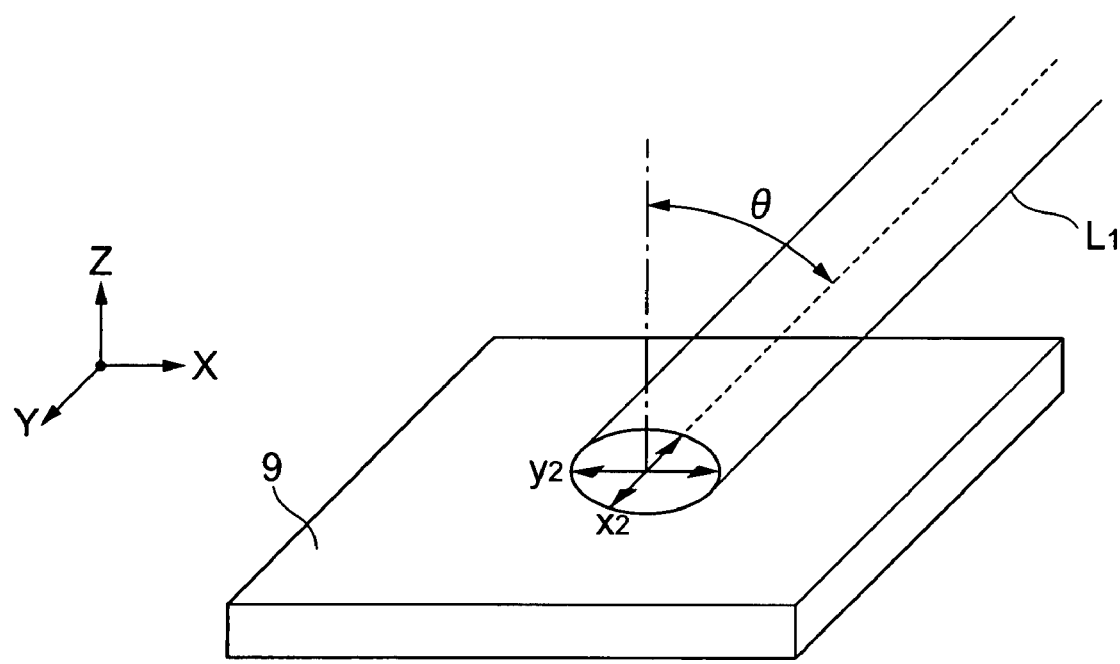
FIG. 2 is a view for explaining the relationship between the form of the irradiation area of adjustment laser light beam and the angle of incidence θ in an object to be processed.

When each of the beam cross-sectional forms of the two adjustment visible laser light beams $L_1$, $L_2$ is circular, for example, the irradiation areas on the object to be processed 9 become elliptical in general as shown in FIG. 2. Letting x2 and y2 be the shorter and longer axis lengths of this ellipse, the angle of incidence θ of the adjustment visible laser light with respect to the surface of the object to be processed 9 is represented by the expression of $\theta=\cos^{-1}(x2/y2)$. When the angle formed by the irradiation direction of the processing laser light $L_0$ and the irradiation direction of the adjustment visible laser light is 45°, the direction and magnitude of inclination of the object to be processed 9 is adjusted such that the angle of incidence θ ($\cos^{-1}(x2/y2)$) becomes 45°, whereby the object to be processed 9 is perpendicularly irradiated with the processing laser light $L_0$ (the processing laser light $L_0$ coincides with the optical axis AX of the imaging lens 62).

The above-mentioned case shows the state that the surface of the object to be processed 9 is incline in only longer axis direction (Y-axis direction) but is not incline in the shorter axis direction (X-axis direction). That is, in the case that the surface of the object to be processed 9 is incline in both longer and shorter axis directions, letting $D_X$ and $D_Y$ be the shorter and longer axis lengths when the surface of the object to be processed 9 is not inline, the incident angle component $\theta_1$ in the shorter axis direction is defined by the expression of $\cos^{-1}(D_X/x2)$ and the incident angle component $\theta_2$ in the longer axis direction is defined by the expression of $\cos^{-1}(D_Y/y2)$. The incident angle of 45° is given in the condition that the processing laser light beam $L_0$ is applied in normal with respect to the surface of the object to be processed 9, and namely means that an irradiation angle component of the adjustment laser light beam with respect the vertically applied processing laser light beam $L_0$. becomes 45°. That is, when the processing laser light beam $L_0$ is incident in an incline state with respect to the surface of the object to be processed 9, the irradiation angle components of the adjustment laser light beam is modified so as to correspond to the inclined processing laser light beam. Also, the inclination adjustment is not limited to the adjustment described above. For example, the inclination adjustment can be performed by, first, measuring the lengths from the optical system to three measurement points on the surface of the object to be processed 9, and adjusting the inclination of the object to be processed 9 such that the respective lengths from the optical system to three measurement points correspond to each other. Emitting electromagnetic wave to the surface of the object to be processed 9 can carry out the length measurement, and thereafter measuring the receiving time of electromagnetic wave reflected at the surface.

Figure 3:
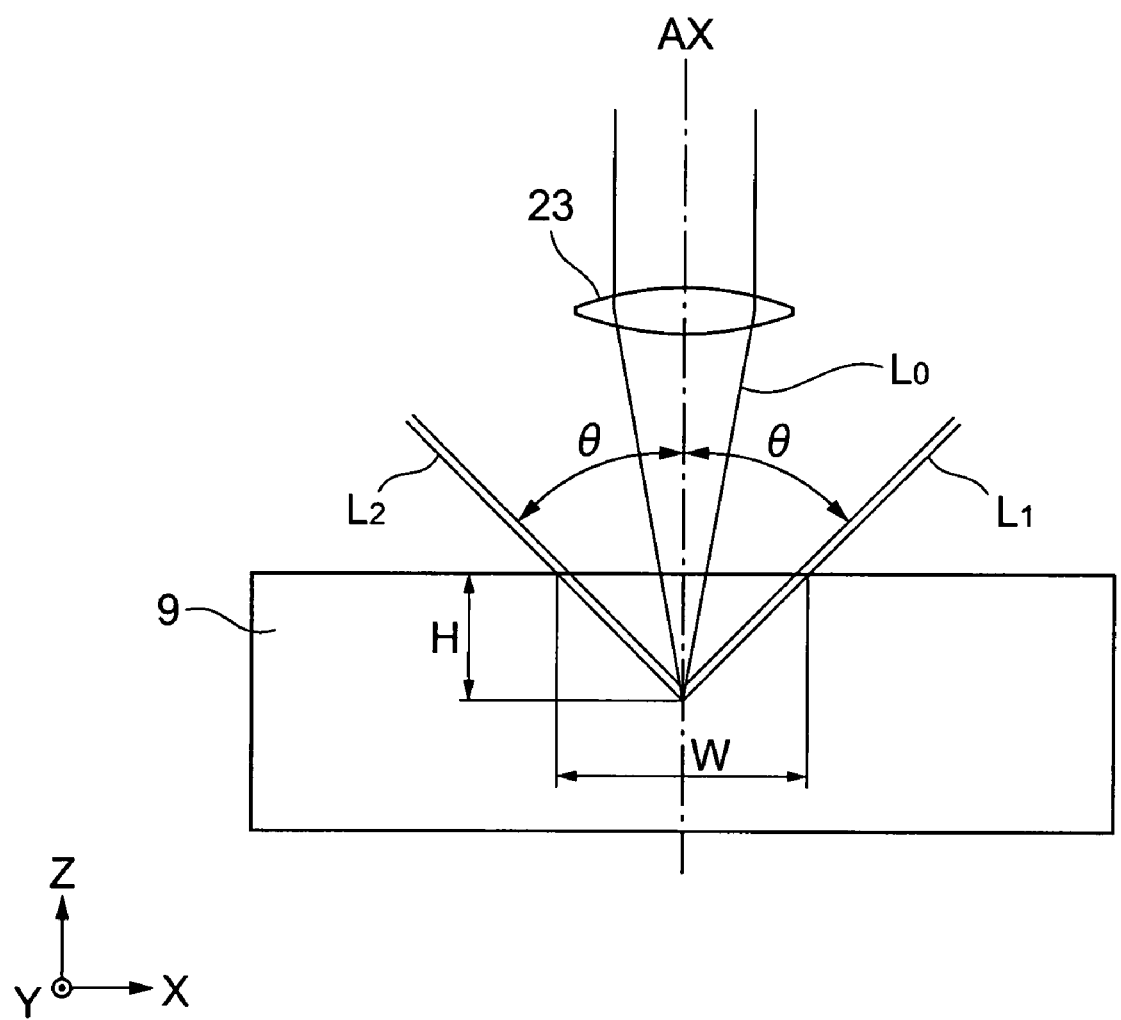
FIG. 3 is a view for explaining the irradiation position of adjustment laser light beam and the converging position depth H of processing laser light beam in the object to be processed.

The converging position of the processing laser light $L_0$ in the object to be processed 9 may be located on the surface of the object to be processed 9 (for printing onto the surface of the object 9, etc.) or within the object 9 (for cutting, welding, and the like of the object 9). When the distance between the respective irradiation positions of the two adjustment visible laser light beams $L_1$, $L_2$ is W in the case where the converging point of the processing laser light $L_0$ is located at depth H within the object to be processed 9 as shown in FIG. 3, the expression of W=2H tan θ holds. Therefore, it will be sufficient if the position of the object to be processed 9 is adjusted such as to yield the irradiation position W by which the desirable depth H is obtained.

Second Embodiment

Figure 4:
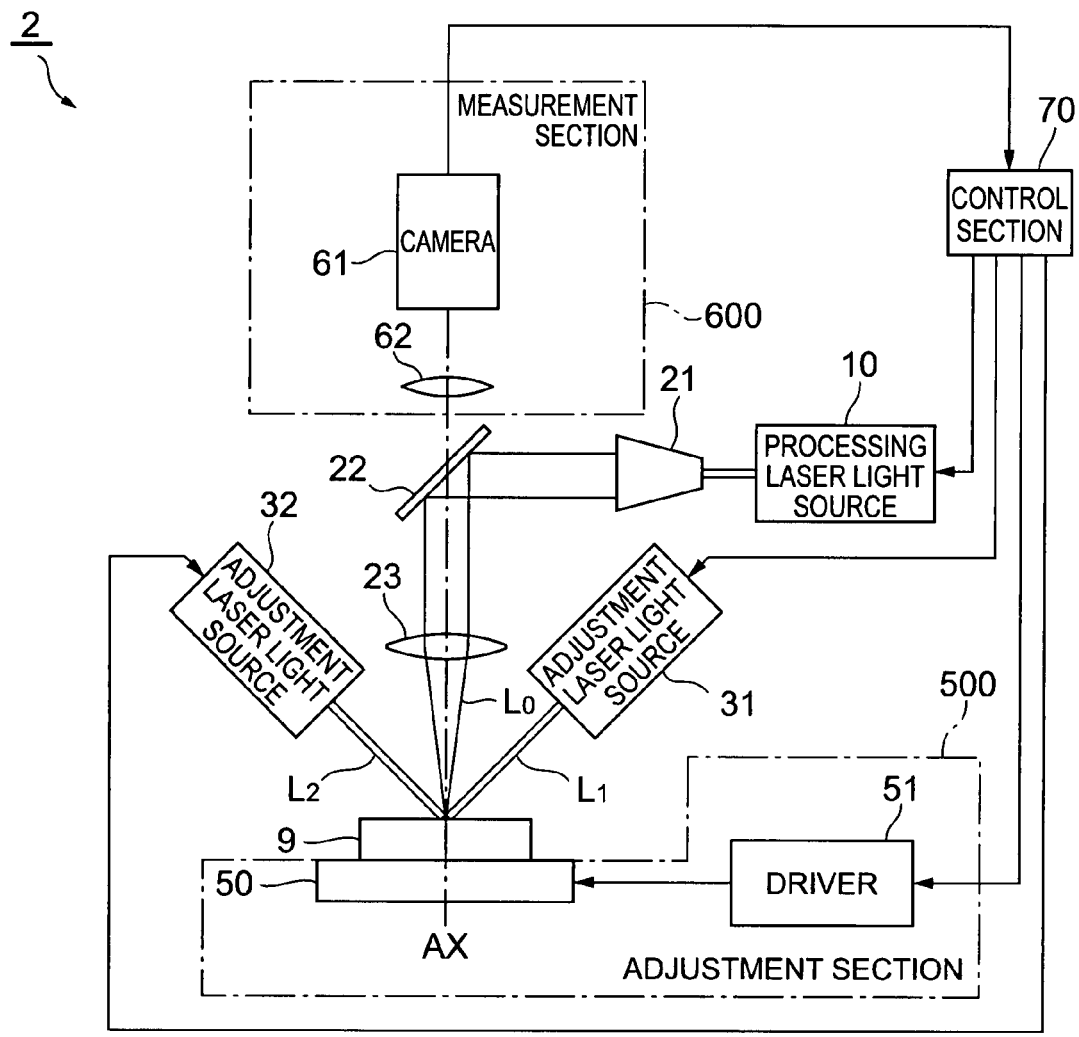
FIG. 4 is a view showing the structure of a second embodiment of a laser processing apparatus according to the present invention.

A second embodiment of the laser processing apparatus and method according to the present invention will now be explained. FIG. 4 is a view showing the structure of the laser processing apparatus 2 according to the second embodiment. The laser processing apparatus 2 shown in this drawing is an apparatus for processing an object to be processed by irradiating the object 9 with converged processing laser light $L_0$. The laser processing apparatus according to the second embodiment comprises a processing laser light source 10, a beam expander 21, a mirror 22, a condenser lens 23, adjustment laser light sources 31, 32, a stage 50, a driver 51, a CCD camera 61, an imaging lens 62, and a control section 70. The CCD camera 61 and imaging lens 62 constitute a measurement section 600. The stage 50 and driver 51 constitute an adjustment section 500.

The structure of the laser processing apparatus 2 according to the second embodiment (FIG. 4) differs from that of the laser processing apparatus 1 according to the first embodiment (FIG. 1) in that it has two adjustment laser light sources 31, 32 in place of the adjustment laser light source 30 and that the adjustment optical system for irradiating the object to be processed 9 with the adjustment visible laser light beams $L_1$, $L_2$ outputted from the adjustment laser light sources 31, 32 from the respective directions different from each other such that the laser light beams $L_1$, $L_2$ intersect with each other at one point on the optical path of the processing laser light $L_0$ does not require any mirror. Thus constructed laser processing apparatus 2 according to the second embodiment can operate as with the laser processing apparatus according to the first embodiment and yield similar effects.

Namely, in an operating example of the laser processing apparatus 2 according to the second embodiment (the laser processing method according to the second embodiment), the adjustment laser light source 31 directly irradiates the object to be processed 9 with the adjustment visible laser light beam $L_1$ while the adjustment laser light source 32 directly irradiates the object to be processed 9 with the adjustment visible laser light beam $L_1$ before the laser light source 10 outputs the processing laser light $L_0$ (first to third steps). Thus, the adjustment visible laser light beams $L_1$, $L_2$ irradiate the object to be processed 9 from directions different from each other depending on the respective positions where the adjustment laser light sources 31, 32 are placed, such that the laser light beams $L_1$, $L_2$ intersect with each other at one point on the optical path of the processing laser light $L_0$ (second step). Then, the respective irradiation positions of the emitted two adjustment visible laser light beams $L_1$, $L_2$ in the object to be processed 9 are measured according to the result of capture by the CCD camera 61 through the imaging lens 62 (third step).

The positional adjustment by the adjustment section 500 is controlled such that thus measured irradiation positions of the two adjustment visible laser light beams $L_1$, $L_2$ coincide with target positions preset according to the relationship between the respective irradiation directions of the two adjustment visible laser light beams $L_1$, $L_2$ and the converging position of the processing laser light $L_0$ (fourth step). Here, the target positions are preset as amounts of deviation in the first step prior to the second step. When the position of intersection of the two adjustment visible laser light beams $L_1$, $L_2$ is adjusted so as to coincide with the converging position of the processing laser light $L_0$ in the first step, for example, the positional adjustment of the object to be processed 9 by the adjustment section 500 is controlled such that the measured irradiation positions of the two adjustment visible laser light beams $L_1$, $L_2$ coincide with each other.

After the positional adjustment mentioned above, the processing laser light source 10 irradiates the object to be processed 9 with processing laser light. The processing laser light $L_0$ outputted from the processing laser light source 10 is converged by the processing optical system (converging optical system) including the beam expander 21, mirror 22, and condenser lens 23, and then irradiates the object to be processed 9. Such a structure makes it possible to process the object to be processed 9 in various ways after accurately adjusting the state of installation of the object to be processed 9.

In the second embodiment, the adjustment visible laser light beam $L_1$ outputted from the adjustment laser light source 31 and the adjustment visible laser light beam $L_2$ outputted from the adjustment laser light source 32 may have the same wavelength or wavelengths different from each other. When the adjustment visible laser light beams $L_1$, $L_2$ have wavelengths different from each other, the respective wavelengths of the adjustment visible laser light beams $L_1$, $L_2$ outputted from the adjustment laser light sources 31, 32 are 633 nm and 355 nm, for example. In this case, the respective irradiation areas of the adjustment visible laser light beams $L_1$, $L_2$ in the object to be processed 9 can be distinguished from each other by their colors even when they overlap with each other, whereby operators can perform a visual verifying operation more reliably.

MODIFIED EXAMPLES

Without being restricted to the embodiments mentioned above, the present invention can be modified in various ways. For example, the number of visible laser light beams irradiating the object to be processed may be 3 or more. When three or more adjustment visible laser light beams irradiate the object to be processed from respective irradiation directions different from each other such as to intersect with each other at one point on the optical path of processing laser light, the state of installation of the object such as the position of the object and the direction and magnitude of its inclination, for example, can be adjusted further easily and accurately.

As described above, the present invention makes it possible to process an object to be processed after accurately adjusting the state of installation of the object.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser beam machining method of irradiating an object to be machined with machining laser light beam, from a specific irradiation direction, said method comprising steps of:
   irradiating the surface of the object with a plurality of adjustment laser light beams as reference light beams for adjusting a converging point of the machining laser light beam, from respective irradiation directions different from each other and further through optical paths different from an optical path of the machining laser light beam, the plurality of adjustment laser light beams having a relationship such that a beam spacing therebetween on the surface of the object changes according to a depth position of the converging point from the surface of the object, irradiation areas of the plurality of adjustment laser light beams satisfying a specific positional relationship with respect to the converging point of the machining laser light beam;
   monitoring irradiation areas of the plurality of adjustment laser light beams, on the surface of the object;
   exacting a positional information of the surface of the object with respect to the converging point of the machining laser light beam, on the basis of information of the irradiation areas and the specific positional relationship;
   moving the object so as to make the beam spacing obtained from the positional information become a predetermined beam spacing; and
   irradiating the object, whose position has been adjusted, with the machining laser light beam, after moving the object.

2. The laser beam machining method according to claim 1, wherein the plurality of the adjustment laser light beams are applied so as to intersect at the converging point of the machining laser light beam.

3. The laser beam machining method according to claim 1, wherein a laser irradiation condition of the machining laser light beam is changed in accordance with the depth position of the converging point of the machining laser light beam from the surface of the object.

4. A laser beam machining apparatus of executing a method according to claim 1, said apparatus comprising:
   a machining laser light source for outputting machining laser light beam for irradiating the object;
   a converging optical system for converging the machining laser light beam outputted from said machining laser light source;
   an adjustment laser light source for outputting a plurality of adjustment laser light beams as reference light beams for adjusting a converging point of the machining laser light beam;
   an adjustment optical system for guiding the plurality of adjustment laser light beams from respective directions different from each other to the object, while irradiation areas of the plurality of adjustment laser light beam satisfy a specific positional relationship with respect to the converging point of the machining laser light beam;
   an adjustment section for moving the object;
   a measurement section for monitoring respective irradiation areas of the plurality of adjustment laser light beams on the object; and
   a control section for exacting a positional information of the surface of the object with respect to the converging point of the machining laser light beam, on the basis of information of the irradiation areas and the specific positional relationship, and calculating an amount of control for controlling said adjustment section so as to make the position of the object with respect to the converging point of the machining laser light beam correspond to a preset position.

5. The laser beam machining apparatus according to claim 4, wherein said adjustment section guides the plurality of adjustment laser light beams so as to intersect with each other at the converging point of the machining laser light beam.

6. The laser beam machining apparatus according to claim 4, wherein said adjustment section includes a drivers stage on which the object is mounted.

7. The laser beam machining apparatus according to claim 4, wherein said control section calculates a direction and amount of inclination of the object, on the basis of respective deformation ratios of the measured irradiation area forms of the plurality of adjustment laser light beams with respect to cross-sectional beam forms thereof.

8. The laser beam machining apparatus according to claim 4, wherein a laser irradiation condition of the machining laser light beam is changed in accordance with the depth position of the converging point of the machining laser light beam from the surface of the object.

9. The laser beam machining method according to claim 1, wherein inclinatory degree and inclinatory direction of the object are adjusted such that the beam cross-section of the one adjustment laser light beam becomes a preset target shape.

10. A laser beam machining method of irradiating an object to be machined with machining laser light beam, from a specific irradiation direction, said method comprising steps of:
  irradiating the surface of the object with a plurality of adjustment laser light beams as reference light beams for adjusting a converging point of the machining laser light beam, from respective irradiation directions different from each other and further through optical paths different from an optical path of the machining laser light beam, while irradiation areas of the plurality of adjustment laser light beams satisfy a specific positional relationship with respect to the converging point of the machining laser light beam;
  monitoring irradiation areas of the plurality of adjustment laser light beams, on the surface of the object;
  exacting a positional information of the surface of the object with respect to the converging point of the machining laser light beam, on the basis of information of the irradiation areas and the specific positional relationship;
  moving the object so as to adjust the state of installation of the object with respect to the converging point of the machining laser light beam, on the basis of the calculated direction and amount of inclination of the object; and
  irradiating the object, whose position has been adjusted, with the machining laser light beam, after moving the object,
  wherein at least one of the plurality of the adjustment laser light beams has a beam cross-section with a predetermined shape, and
  wherein, after exacting information concerning the beam cross-section of the one adjustment laser light beam on the irradiation area by monitoring the associated one of the irradiation areas, an inclinatory condition of the object is adjusted such that the extracted beam cross-section on the irradiation becomes similar to the predetermined shape.

11. A laser beam machining apparatus for executing the method according to claim 10, said apparatus comprising:
  a machining laser light source for outputting machining laser light beam for irradiating the object;
  a converging optical system for converging the machining laser light beam outputted from said machining laser light source;
  an adjustment laser light source for outputting a plurality of adjustment laser light beams as reference light beams for adjusting a converging point of the machining laser light beam;
  an adjustment optical system for guiding the plurality of adjustment laser light beams from respective directions different from each other to the object, while irradiation areas of the plurality of adjustment laser light beam satisfy a specific positional relationship with respect to the converging point of the machining laser light beam;
  an adjustment section for moving the object;
  a measurement section for monitoring respective irradiation areas of the plurality of adjustment laser light beams on the object; and
  a control section for exacting a positional information of the surface of the object with respect to the converging point of the machining laser light beam, on the basis of information of the irradiation areas and the specific positional relationship, and calculating an amount of control for controlling said adjustment section so as to make the position of the object with respect to the converging point of the machining laser light beam correspond to a preset position.

12. The laser beam machining apparatus according to claim 11, wherein inclinatory degree and inclinatory direction of the object are adjusted such that the beam cross-section of the one adjustment laser light beam becomes a preset target shape.

* * * * *